United States Patent [19]

Osugi et al.

[11] Patent Number: 5,715,341
[45] Date of Patent: Feb. 3, 1998

[54] APPARATUS HAVING AT LEAST ONE ROTATABLE HOLDER FOR ADJUSTING ALIGNMENT BETWEEN END FACES OF OPTICAL SUBSTRATES

[75] Inventors: Yukihisa Osugi; Yasuharu Kuno, both of Nagoya, Japan

[73] Assignee: NGK Insulators, Ltd., Japan

[21] Appl. No.: 590,456

[22] Filed: Jan. 23, 1996

[30] Foreign Application Priority Data

Jan. 27, 1995 [JP] Japan ................... 7-011335

[51] Int. Cl.⁶ ...................... G02B 6/26; G02B 6/42
[52] U.S. Cl. .................................................. 385/50
[58] Field of Search .................. 385/38–39, 50–52, 385/88, 89, 147

[56] References Cited

U.S. PATENT DOCUMENTS

| | | | |
|---|---|---|---|
| 4,725,114 | 2/1988 | Murphy | 385/59 |
| 4,781,743 | 11/1988 | Holmes | 385/129 |
| 5,197,109 | 3/1993 | Ichigi et al. | 385/50 |
| 5,390,267 | 2/1995 | Yanagawa et al. | 385/50 X |
| 5,499,309 | 3/1996 | Kozuka et al. | 385/38 |

FOREIGN PATENT DOCUMENTS

| | | |
|---|---|---|
| 0 509 789 A2 | 10/1992 | European Pat. Off. . |
| 0 541 820 A1 | 5/1993 | European Pat. Off. . |
| 2 660 443 | 10/1991 | France . |

*Primary Examiner*—Akm E. Ullah
*Attorney, Agent, or Firm*—Parkhurst & Wendel

[57] ABSTRACT

An apparatus for adjusting a degree of parallel alignment between end faces of a plurality of optical substrates, comprising a holder for holding each of the optical substrates, and a moving mechanism for moving at least one of said optical substrates, whereby opposed end faces of the optical substrates are contacted with each other, and said end faces are made in parallel with each other by exerting a contacting pressure upon the optical substrates in a contacting movement direction.

9 Claims, 8 Drawing Sheets

FIG_1a

FIG_1b

FIG_4

FIG_7

APPARATUS HAVING AT LEAST ONE ROTATABLE HOLDER FOR ADJUSTING ALIGNMENT BETWEEN END FACES OF OPTICAL SUBSTRATES

BACKGROUND OF THE INVENTION

The present invention relates to an apparatus for adjusting a degree of parallel alignment between end faces of an optical substrate.

Recently, a technique for the formation of optical waveguides for $LiNbO_3$ (lithium niobate) single crystal substrates by a titanium indiffusion method has attracted attention. Such an optical waveguide substrate is used as a substrate for a waveguide type optical modulation element, an optical waveguide type dividing/coupling circuit or an optical waveguide type coupling/dividing circuit, and is expected to be used as a substrate for an optical waveguide integrated optical circuit in the future.

In the above optical waveguide substrate, an end face of the optical waveguide is end-to-end coupled with that of an external optical fiber so that light must be effectively transmitted between the optical fiber and the optical waveguide. At that time, if a gap is present between the end face of the optical fiber and that of the optical waveguide or optical axes of them are positionally deviated from each other, the light transmission loss increases. Therefore, the end faces must be coupled to each other with high accuracy. Specifically, it is necessary that the end faces are closely contacted with each other in parallel, whereas the positional deviation between a core portion of the optical fiber and the optical waveguide. Some end face-coupling processes have been known for this purpose. However, according to every conventional process, a laser beam passed when the optical waveguide is joined to the end face of the optical fiber, whereby a maximum light transmission amount indicates alignment. This optical axis alignment technique requires a very long time, which deteriorates workability and reduces productivity.

In order to solve the above problems, Japanese patent application Laid-open No. 2-125209 discloses a process for aligning an end face of an optical waveguide with that of optical fiber by forming a guide groove at an optical waveguide substrate, providing a guide pin at an optical fiber-holding connector, and fitting the guide pin into the guide groove.

However, the inventors discovered that although each of upper and lower plates is made of an Si chip or plastic, it is difficult to couple the end face of the optical waveguide with that of the end face of the optical fiber at a high accuracy, which consequently makes it very difficult to attain an excellent coupling efficiency.

The present inventors examined a process in which an optical waveguide substrate was made by forming an optical waveguide in a substrate material, an array uniting substrate (an optical fiber array unit) was prepared by forming a given number of V-grooves in a material for this optical fiber array unit, end faces of the optical waveguide substrate and the optical fiber array unit were mechanically worked and optically polished at as high an accuracy as possible, and these opposed end faces were coupled by employing the outer contours of the substrate as reference surfaces. In this process, the end faces of the optical fiber array unit and the optical waveguide substrate are opposed to each other, and set in parallel to each other, and then their optical axes are aligned. However, the working accuracy of these end faces corresponds to a working accuracy of, for example, about 50 μm, which is converted to a variation of 1 degree or more in terms of an angular accuracy. If the parallel degree between the end faces of the optical fiber array unit and the optical waveguide becomes worse, the light transmission loss increases and the durability is deteriorated. Therefore, it is desirably necessary to adjust the parallel degree at not more than 0.1 degree. However, for the above reason, the above end faces cannot be accurately set in parallel with each other only by opposing and butting the end faces under the alignment of the optical axes. However an appropriate apparatus has not been available, which enabled the parallel degree between such end faces to be adjusted with high accuracy.

SUMMARY OF THE INVENTION

It is an object of the present invention to provide an apparatus for enabling end faces of optical substrates (optical waveguide substrate and optical fiber-array uniting substrate) to be opposed and butted against each other at a high degree of parallel alignment.

The present invention is directed to the apparatus for adjusting the parallel degree of the end faces of plural optical substrates, which apparatus is characterized by comprising holders adapted for holding the respective substrates, and a moving mechanism for moving at least one of the optical substrates, wherein at least one of the optical substrates is rotatably held, and the opposed end faces of the optical substrates are set in parallel to each other by contacting these opposed end faces and exerting pressure thereupon in a contacting movement direction.

The present inventors held each of the optical substrates such that one of these optical substrates was rotatably held, contacted the opposed end faces of the optical substrates by moving the opposing optical substrate to first optical substrate and exerted pressure between the contacted substrates in a contacting movement direction. Consequently, the inventors discovered that the opposed end faces of the optical substrates could be made in parallel to each other at high accuracy by such extremely simple operation and mechanism. The inventors reached the present invention based on this discovery.

These and other objects, features and advantages of the invention will be appreciated upon reading of the following description of the invention when taken in conjunction with the attached drawings, with the understanding that some modifications, variations and changes of the same could be easily made by the skilled person in the art to which the invention pertains.

BRIEF DESCRIPTION OF THE DRAWINGS

For a better understanding of the invention, reference is made to the attached drawings, wherein.

DETAILED DESCRIPTION OF THE INVENTION

First, the present invention will be explained with respect to embodiments applied to the so-called 4 row-4 row light switching elements by referring to FIG. 1. As a matter of course, the present invention may be applied to other light substrates, for example, a light substrate shown in FIG. 8.

An optical waveguide substrate 36 is formed with, for example, four rows of optical waveguides 37. The optical waveguides are formed by a titanium indiffusion method, lithium out-diffusion method, proton exchange process or the like. As a matter of course, the number of rows and the planar shape of the optical waveguides 37 may be appropriately changed depending upon the specification of intended products.

Each of a pair of Optical fiber array units 31A and 31B is formed with four rows of V grooves (guide grooves) 32 by mechanical working. As a matter of course, the number of rows and the formed locations of the guide grooves 32 must be aligned with those of the optical waveguides 37, respectively. Further, a seat depression 35 is formed on each of the optical fiber array units 31A and 31B. Then, an optical fiber 33 is accommodated and located in each of the guide grooves 32 of a pair of the optical fiber array units 31A, 31B. In FIG. 1, the optical fibers 33 are housed in a covering 34 which is fixedly received by the seat depression 35. An end face 38 of each of the optical fiber array units 31A and 31B is optically polished, and a pair of end faces 39 of the optical waveguide substrate 36 are also optically polished.

Figure 1A:
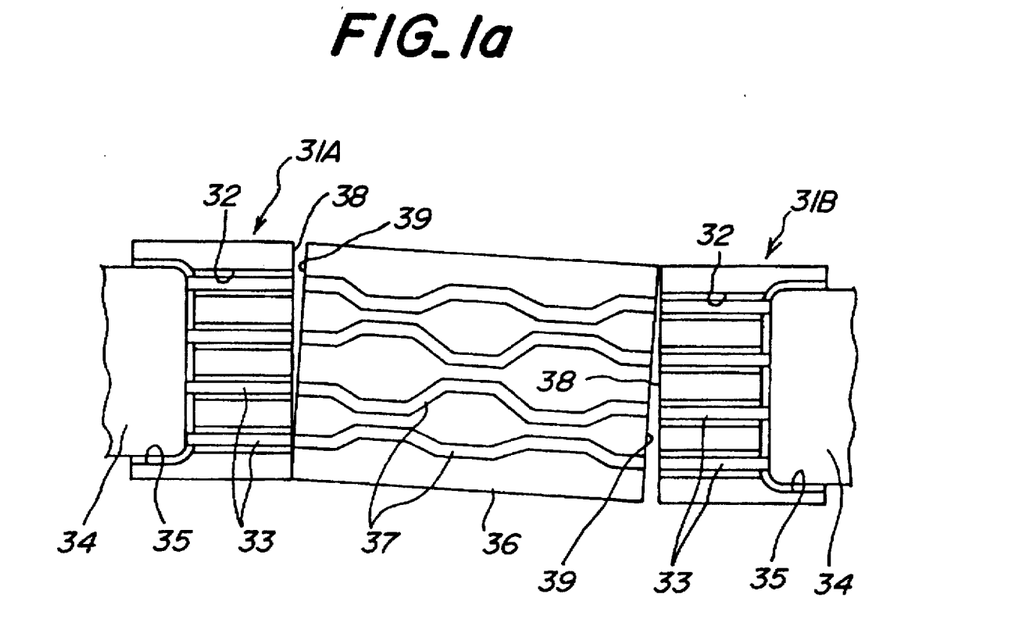
FIG. 1(a) is a plane view for illustrating an optical waveguide substrate and optical fiber array units before the former is aligned with the latter.
Figure 1B:
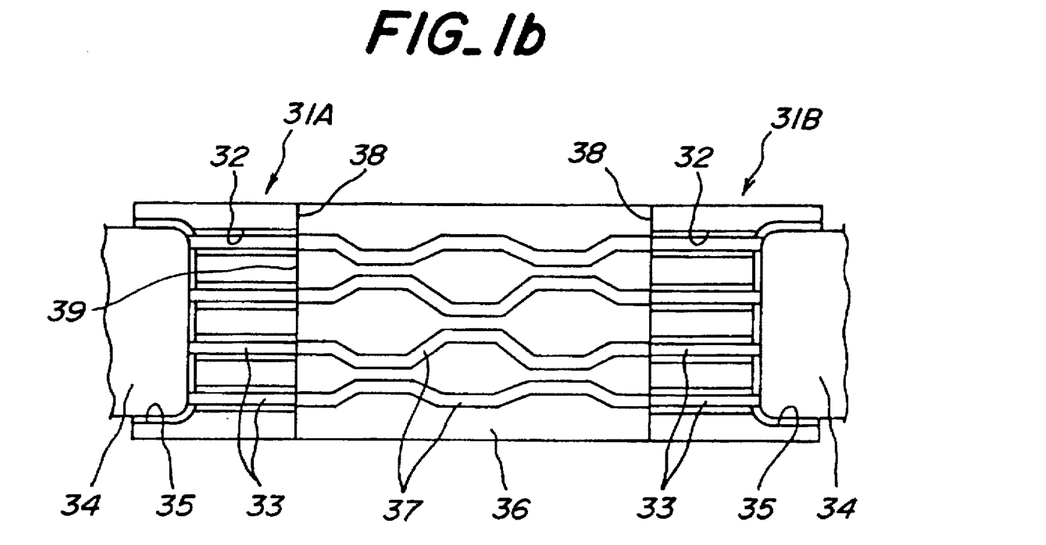
FIG. 1(b) is a plan view for illustrating the optical waveguide substrate and the optical fiber array units after the former is aligned with the latter.

Before the parallel alignment among the end faces is adjusted, the end faces 38 and 39 on each side are inclined relative to each other as shown in FIG. 1(a). The actual surface accuracy of these end faces is about 50 μm, which is converted to an angular accuracy of 1 degree or more. On the other hand, in order to reduce the amount of light loss and improve the durability, the parallel alignment is required to be around 0.1 degree in accuracy. It is difficult and costy to mechanically work the end faces 38 and 39 in the above required accuracy.

However, according to the present invention, the end faces 38 and 39 can be aligned in parallel with high accuracy by rotatably holding the optical waveguide substrate 36, bringing the optical fiber array units 31A and 31B to the optical waveguide substrate 36, contacting the end faces 39 of the optical waveguide substrate 36 with end faces 38 of the optical fiber array units 31A and 31B, respectively and applying pressure along a contacting direction.

The almost similar effect can be attained by rotatably holding the optical fiber array units 31A and 31B, brining the optical fiber array units 31A and 31B to the optical waveguide substrate 36, contacting the end faces 39 of the optical waveguide substrate 36 with those end faces 38 of the optical fiber array units 31A and 31B, respectively, and applying pressure along a contact direction.

Further, the invention apparatus may include a pressure detector which detects change in pressure due to contacting when the opposed end faces of the optical substrates are contacted with each other. The optical fiber array unit and the optical waveguide substrate made of a ceramic material are likely to be cracked upon strong impact, resulting in increasing an unacceptable article percentage and decreasing yield. Thus, it is preferable for such a pressure detector to adjust the contacting pressure lest that the pressure may be excessive.

Furthermore, the invention apparatus may include a slide mechanism for sliding the holder in a direction in which a load is applied to the holder, so that the load may not be excessively applied upon the optical substrates when the opposed end faces of the optical substrates are contacted with each other. In addition, a clamping mechanism may be preferably provided to fix the slide mechanism after the holder is slid.

Moreover, it is preferable to rotatably hold the optical substrate by means of two sets of turn stages that all freely turnable. Such turn tables themselves having extremely high accuracy are commercially available and advantageously used.

When the opposed end faces of the optical substrates are to be contacted with each other, an optical substrate-turning torque can be most effectively transmitted by substantially coinciding the rotary centers of the rotary stages with the end faces of the optical substrates. By so doing, possible breakage of the optical substrates due to application of excess stress upon the optical substrates can be prevented.

In this case, it is preferable to prevent inclination of the optical substrates by providing a weight on a side opposite to the optical substrate as viewed from the rotary centers of the turn stages, said weight being adapted to balance the turn tables.

Figure 2:
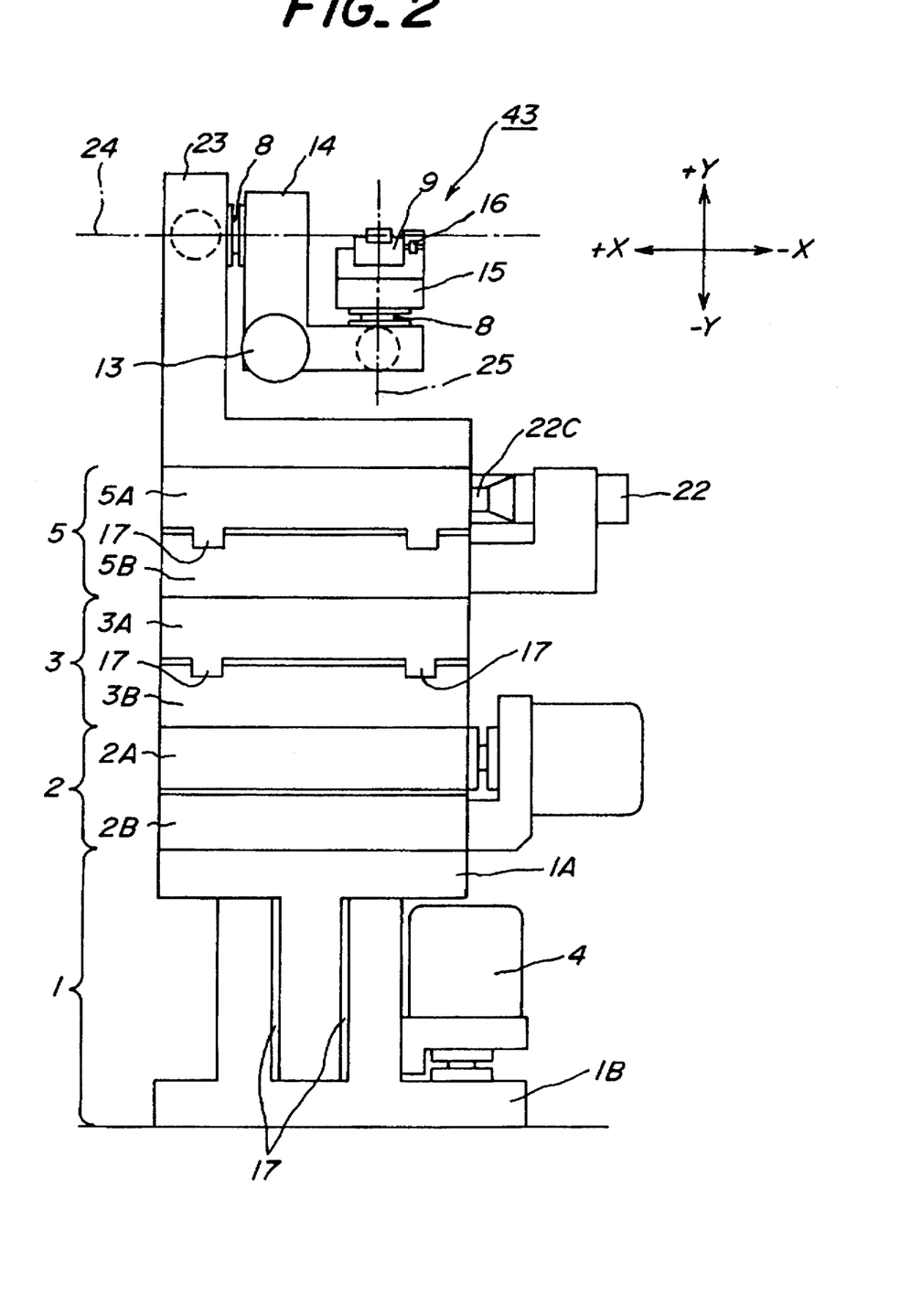
FIG. 2 is a front view illustrating an end face-adjusting apparatus according to an embodiment of the present invention as viewed in a Z direction.
Figure 3:
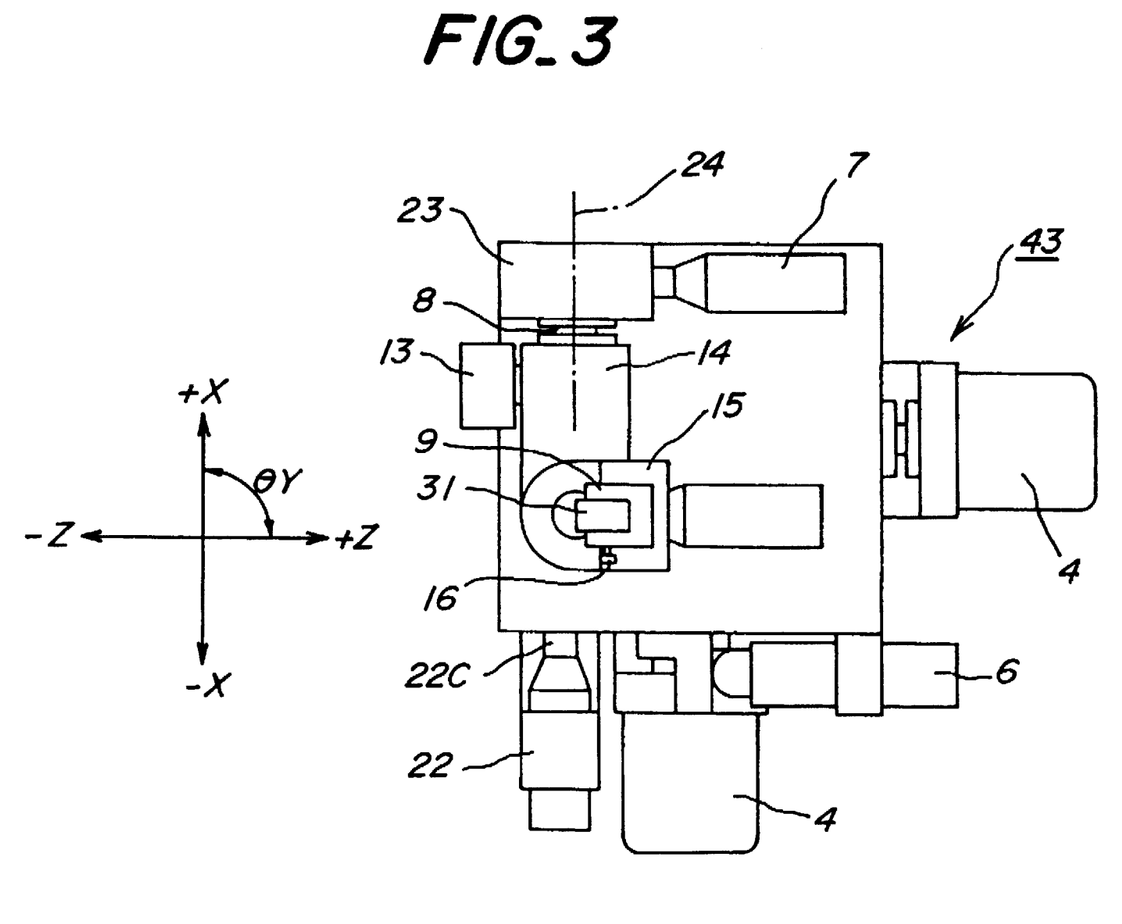
FIG. 3 is a front view illustrating the end face-adjusting apparatus of FIG. 2 as viewed in a Y direction.
Figure 4:
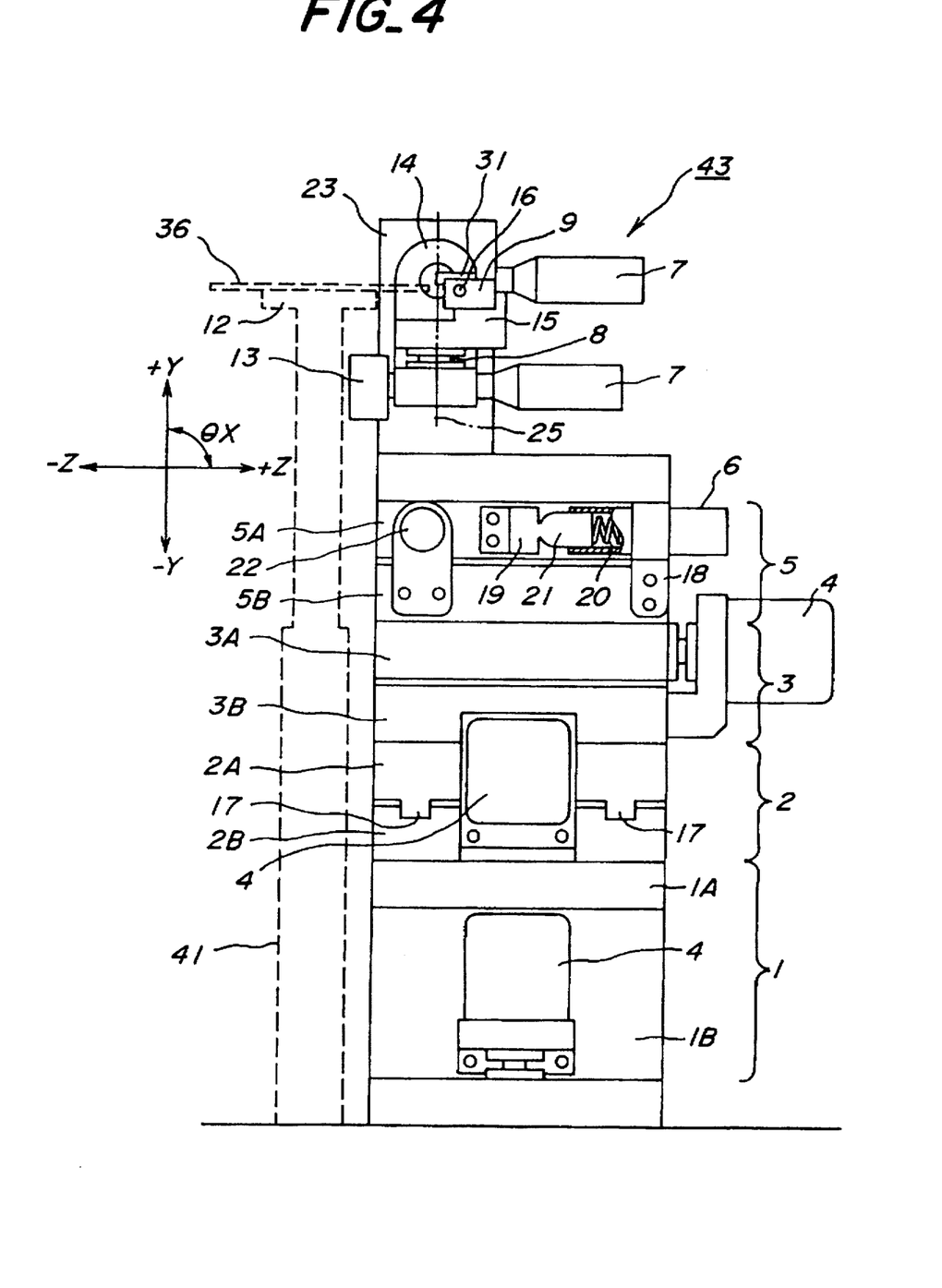
FIG. 4 is a front view illustrating the end face-adjusting apparatus of FIG. 2 as viewed in an X direction.

FIG. 2 is a front view illustrating the end face-adjusting apparatus according to one embodiment of the present invention as viewed in the Z direction; FIG. 3 is a front view illustrating the end face-adjusting apparatus of FIG. 2 as viewed in the Y direction; and FIG. 4 is a front view illustrating the end face-adjusting apparatus of FIG. 2 as viewed in the X direction.

A Y-axis stage 1, an X-axis stage 2 and a Z-axis stage 3 are provided in this order from the lower side of the apparatus. Each stage 1, 2, 3 is constituted by an upper member 1A, 2A, 3A and a lower member 1B, 2B, 3B, and the upper member and the lower member are movable in parallel to each other along stage rails 17. Each stage is provided with a step motor 4, and a screw feed mechanism is connected to a rotary shaft of the step motor 4. The upper and lower members 1A, 1B; 2A, 2B; 3A, 3B are moved parallel to each other by rotating a feed screw of the screw feed mechanism.

A Z-axis movable stage 5 is provided on the Z-axis stage 3, and the Z-axis movable stage 5 also includes an upper member 5A and a lower member 5B which are movable in parallel to each other. As shown in FIG. 4, a spring 20 and a spring cap 21 are inserted into and internally contacted with a pipe-shaped spring case 6. The spring cap 21 is slidable along the inner peripheral face of the spring case 6. When a force is applied to the spring cap 21, the spring 20 is compressed. Preferably, a solenoid and a magnet are accommodated inside a movable stage chuck 22 so that the movable stage 5 may be fixed at a given location by electric operation from the outside.

The Z-axis movable stage 5 is a movable mechanism which prevents application of excess load upon the optical substrates when the optical substrates contact each other, and a spring 20 is a mechanism for preventing this load from becoming excessive. No feed mechanism is provided for the Z-axis movable stage 5. If neither clamp nor spring are provided, the upper and lower members are freely movable. The spring case 6 is fixed to the lower member 5B by means of a fixing member 18, whereas the spring cap 21 is fixed to the upper member 5A by means of a fixing member 19. If a force is applied to the upper member 5A in a +Z-axis direction, the upper member 5A moves relative to the lower member 5B in the +Z-axis direction. As a result, the fixing member 19 presses the spring cap 21 toward the +Z-axis direction so that the spring may be compressed. By this reaction, the upper member 5A is pressed in the −Z-axis direction by the elastic restoring force of the spring. The movable stage chuck 22 is attached to the lower member 5B. When the chuck 22 is switched to a chucking state, the relative positional relationship between the upper and lower members 5A and 5B is fixed.

A turn stage-supporting jig 23 is provided on the stage 5, and a θX-axis stage 14 is fitted to the jig 23 via a bearing 8. The stage 14 is freely turnable around a rotary axis 24 in θX directions. The stage 14 is provided with an electromagnetic chuck 7 by which the rotary axis of the bearing may be chucked to prevent rotation of the stage 14.

Further, a θY-axis stage 15 is attached to a tip portion of the stage 14 via a bearing 8. The stage 15 is freely turnable around a rotary axis 25 in θY directions. The stage 15 is also provided with an electromagnetic chuck 7 by which the rotary axis of the bearing may be chucked to prevent rotation of the stage 14. The rotary axes 24 and 25 pass the end face of the optical fiber array unit 31.

Figure 5A:
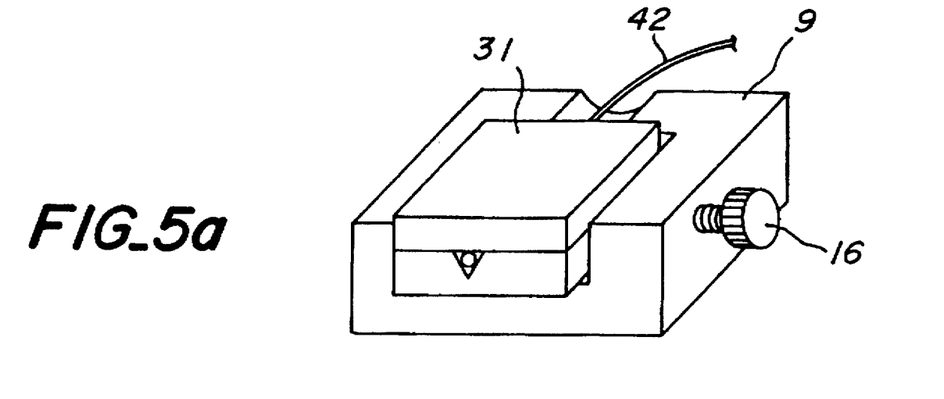
FIG. 5(a) is a perspective view of a jig 9 in which an optical fiber array unit 31 is placed and fixed.
Figure 5B:
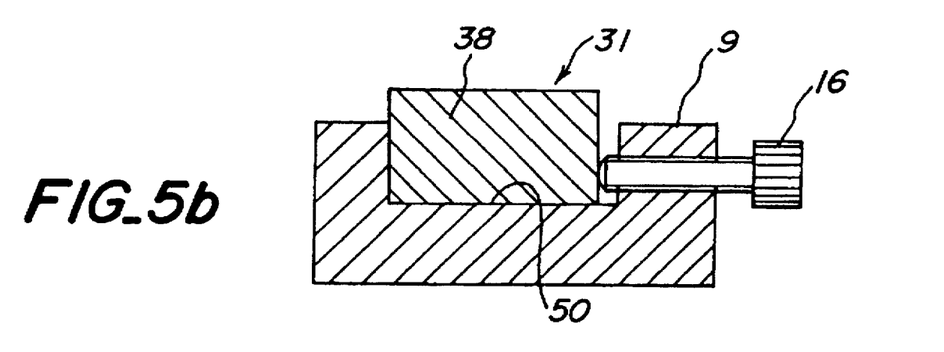
FIG. 5(b) is a sectional view of the jig 9 in which the optical fiber array unit 31 is placed and fixed.

A fixing jig 9 is provided on the stage 15, and the optical fiber array unit 31 is supported on the fixing jig 9. FIGS. 5(a) and (b) show enlarged portions of the optical fiber array unit and the vicinity thereof. The optical fiber array unit 31 is placed in a recess 50 of the jig 9, and a fixing pin 16 is contacted with and pressed against a side face of the array unit 16 so that the optical array unit 31 may not be positionally deviated. A reference numeral 42 denotes an optical fiber.

The parts placed on the stage 14 may be inclined due to their self weights when the electrostatic chuck is turned off. In view of this, balancing is kept by a weight 13 so that the parts may not be inclined through the rotation of the rotary shaft 24.

Figure 6:
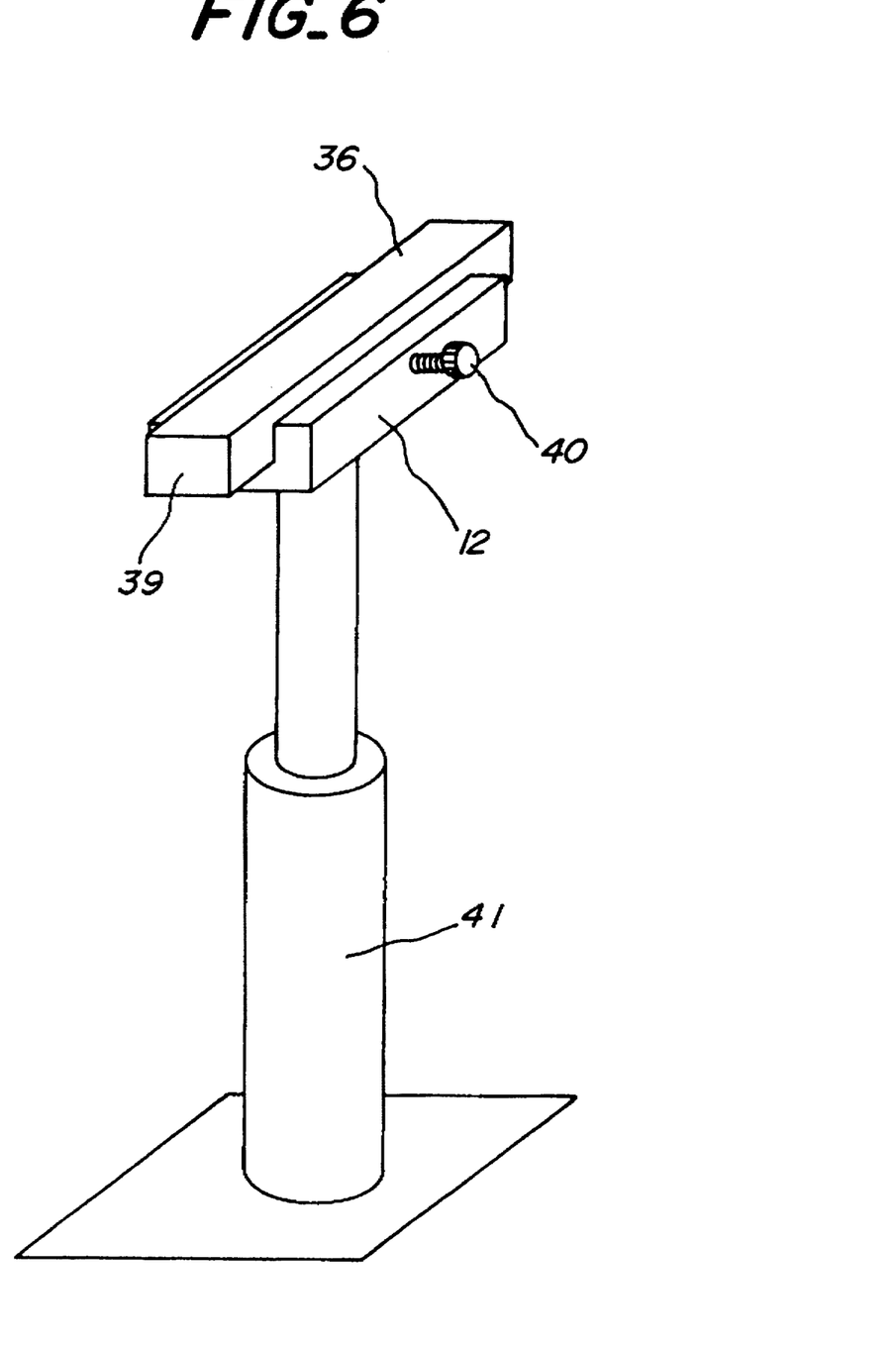
FIG. 6 is a perspective view of a holder 41 in which an optical waveguide substrate 36 is placed and fixed.
Figure 7:
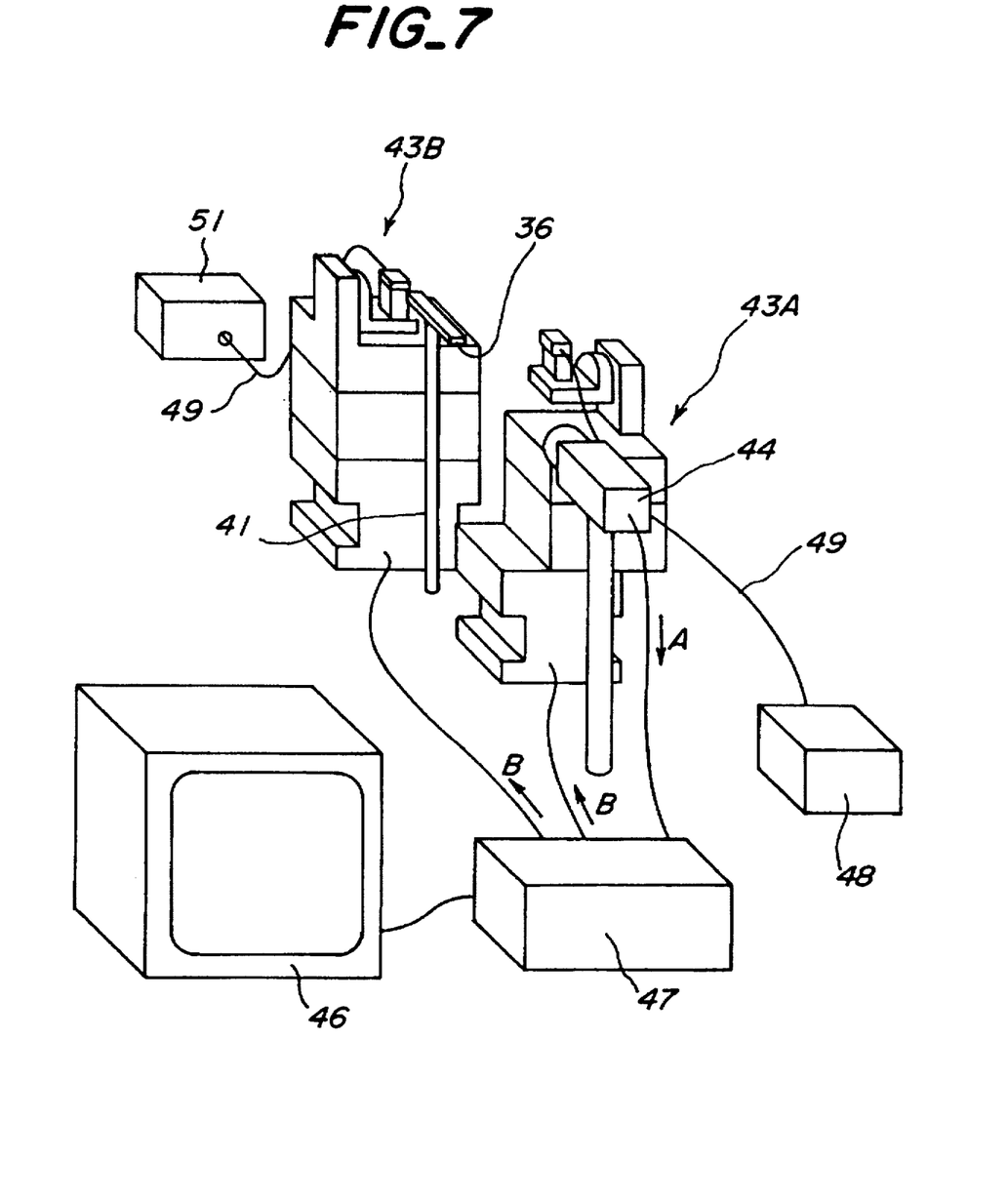
FIG. 7 is a perspective view for schematically illustrating an aligning apparatus to align end faces of a pair of optical fiber array units to respectively opposed end faces of an optical waveguide substrate.

On the other hand, an optical waveguide substrate holder 41 is opposed to an optical fiber array unit holder 43 including the jig 9. As shown in FIG. 6, a jig 12 is provided at an upper end of the holder 41, and the optical waveguide substrate 36 is received in this jig 12 and positionally fixed by a screw 40. In this embodiment, a pair of such optical fiber array unit holders 43A and 43B are arranged on the opposite sides of the holder 41 as schematically shown in FIG. 7. A light-emitting side end 38 of the optical waveguide substrate 36 is observed by a camera 44 so that it may be photographed. The camera 44 is connected to a television 46 and a controller through a wire 46.

Next, a method for aligning the optical axes of the optical fibers with those of the optical waveguide substrate will be illustrated. As shown in FIG. 7, the optical fiber array unit on the light-incident side, the optical waveguide substrate and the optical fiber array unit on the light-emitting side are opposed to one another, and their optical axes are successively aligned as follows:

(1) The motor 4 and the chucks 7 and 22 are connected to the controller 47 so that they may be operated based on signals B from the outside.

(2) Each of the optical fiber array units 31A and 31B on the light-incident and light-emitting sides, respectively, is arranged in the jig 9, and an optical fiber on the light-incident side is connected to a laser beam source, whereas an optical fiber on the light-emitting side is connected to a light intensity detector.

(3) The optical waveguide substrate 36 is placed and fixed on the holder.

(4) The end faces 38 and 39 of the optical waveguide substrate and the optical fiber array unit are worked at a dimensional accuracy of about 50 μm. Although an error occurs between these end faces at a level of about 50 μm when the optical waveguide substrate and the optical fiber array unit are set at their initial positions, the end face of the optical waveguide substrate can be substantially opposed to that of the optical fiber array unit.

(5) The chucks are turned off.

(6) The step motor 4 of the stage 3 is operated on the light-incident side so that the upper member 3A may be moved in the −Z direction to contact the optical waveguide substrate with the optical fiber array unit. At that time, when a pressure sensor detects that the optical waveguide substrate contacts the optical fiber array unit, contact pressure at the time of contacting is mitigated by the spring 20 to adjust the pressure to an appropriate level. This pressure is not smaller than required to obtain a torque for moving the rotary stages 14, 15, which may be determined by the smoothness of the bearing 8 and the dimensions of the end faces of the optical waveguide substrate and the optical fiber array unit. As the rotary stages 14 and 15 turn, the direction of the end face of the optical fiber array unit changes. Finally, the end face of the optical fiber array unit is closely contacted in parallel with that of the optical waveguide substrate. In this state, the electrostatic chuck 7 of each rotary stage is locked so that the rotary stages 14 and 15 may be fixedly prevented from being turned. On the other hand, the chuck 22 is operated to fix the stage 5.

(7) With respect to the optical fiber array unit on the light-emitting side, the same steps as in the light-incident side are taken.

(8) The step motor 4 of the stage 3 is operated on the light-incident side so that the upper member 3A may be moved in the +Z direction. In this state, since the chuck 22 is locked, a moved amount of the upper member 3A is equal to a gap between the end face of the optical guidewave substrate and that of the optical fiber array. Although this gap between these end faces must be controlled down to not more than 1 μm, such a high accuracy control cannot be realized only by working the outer contour of the end faces. However, according to the present invention, the locating accuracy can be realized at 0.1 μm or less by using the above-mentioned stages so that the end faces may be accurately adjusted in parallel with each other. The gap between the end faces needs be kept in such a given range that allows light to enter the optical waveguide substrate from the end face of the optical fiber array unit but prevents contact between the end faces during the alignment.

(9) Next, the above operation (8) is carried out with respect to the light-emitting side.

(10) The step motor 4 of the stage 2 on the light-emitting side is moved so that the upper member 2A may be moved in the +X direction to move the optical fiber array unit and the parts surrounding it in such an area as not to interrupt the observation of the end face of the optical waveguide substrate.

(11) The television camera 44 is set in an area where the optical waveguide at the light-emitting end face of the optical waveguide substrate is considered to be present, so that the end face can be observed at a vision field of about 500 µm or less. As shown by an arrow in FIG. 7, an image photographed by the television camera is sent to the controller 47 and the television 46 via the wire 45. Judging from the working accuracy, it is sufficiently possible to set the optical waveguide in this field of vision.

(12) The laser beam connected to the optical fiber in the above (2) is lit so that the laser beam may be passed through the optical fiber 49. The stages 1 and 2 and the motor 4 are driven to effect the alignment on the light-incident side. When the alignment is effected to allow the light to pass through the optical waveguide, a portion corresponding to the optical waveguide is seen to be bright in the image photographed by the television camera set in the above (11).

(13) The stage on the light-emitting side is returned to the location in the above (9) before the movement.

(14) The stages 1 and 2 and the motor 4 are moved to effect the alignment of the optical axes on the light-emitting side. When the alignment is effected to allow the light to pass through the optical substrate, the output of the light intensity detector 48 connected to the optical fiber in the above (2) increases. The stages 1 and 2 are adjusted to give the maximum output.

By the above-mentioned steps, the adjustment in the connection between the optical fiber and the optical waveguide is terminated so that the light may pass the optical fiber and the optical waveguide substrate.

(15) An adhesive (for example, an UV curable type adhesive) for bonding the optical waveguide substrate and the optical fiber array is dropwisely applied to the bonding end faces thereof.

(16) The motor 4 on the light-incident side is moved so that the gap between the end face of the optical fiber array unit and the optical waveguide substrate may be set at a given level. The amount of movement in this step is determined from that in the above step (8). The gap between the end faces is determined by the kind of the resin, the materials of the optical waveguide and the optical fiber array unit, etc.

(17) The same operation as in the above (16) is effected with respect to the light-emitting side.

(18) When the adhesive is dropped and the gap between the end faces is adjusted, the light-permeating state slightly changes. Therefore, alignment is effected again. That is, the alignment is effected by driving the stages 1, 2 and the motor 4 on the light-incident side so that the output from the light intensity detector may be maximum.

(19) The same operation as in the above (18) is effected with respect to the light-emitting side.

(20) The adhesive is cured.

(21) The optical fiber array units and the optical substrate are removed from the holders.

The following may be alternatively employed in place of the above procedure.

The jig 23, the bearing 8 and the rotary stages 14, 15 are removed from the alignment apparatus shown in FIGS. 2 to 7. Instead, two automatic rotary stages of which rotary angles can be electrically controlled are provided, and the optical fiber array unit is placed on the automatic rotary stages in the same manner as mentioned above. Such automatic rotary stages are known. One of these automatic rotary stages has a rotary axis 25, and the other has a rotary axis 24. In order to observe an upper face and a side face of a light-incident end face between the optical fiber array unit on the light-incident unit and the optical guidewave substrate, a television is arranged. Similarly, in order to observe an upper face and a side face of a light-emitting end face between the optical fiber array unit on the light-emitting side and the optical guidewave substrate, a television is arranged. A computer is arranged to process the output images from these cameras.

The alignment is effected by the above steps (1) through (4). Without effecting the steps (5) through (7), the following steps are instead carried out.

(5') With respect to the image of the upper face on the light-incident side, binary coding and edge detection are effected, so that inclined angles of the end face of the optical waveguide substrate and that of the optical fiber array unit relative to the Y direction are measured.

(6') While the detection in the above (5') is being carried out, one of the automatic rotary stages is turned around the rotary axis 25 so that the inclined angle of the optical fiber array unit relative to the Y direction may be coincident with that of the optical waveguide substrate.

(7') With respect to the image of the side face on the light-incident side, binary coding and edge detection are effected, so that inclined angles of the end face of the optical waveguide substrate and that of the optical fiber array unit relative to the X direction are measured.

(8') While the detection in the above (7') is being carried out, one of the automatic rotary stages is turned around the rotary axis 24 so that the inclined angle of the optical fiber array unit relative to the X direction may be coincident with that of the optical waveguide substrate.

(9') With respect to the light-emitting side, the same steps as in the above (5') to (9') are effected to adjust the parallel degree between the end faces on the light-emitting side.

(10') The chuck 22 is turned off.

(11') The motor 4 of the stage 3 on the light-incident side is moved so that the upper member 3A may be moved in the −Z direction to contact the end face of the optical waveguide with that of the optical fiber array unit. The movable stage 5 is necessary so as to prevent breakage of the optical parts due to application of an excess load upon the parts during contacting. In this stage, the chuck 22 is locked to fix the upper member 5A and the lower member 5A of the movable stage 5.

(12') With respect to the light-emitting side, the same procedure as in a step (11') is carried out.

Then, the alignment step in (8) to the bonding step (21) may be carried out.

In the above embodiment, the angle of the end face of the optical fiber array unit and that of the end face of the optical waveguide substrate were measured by the image processing.

Figure 8:
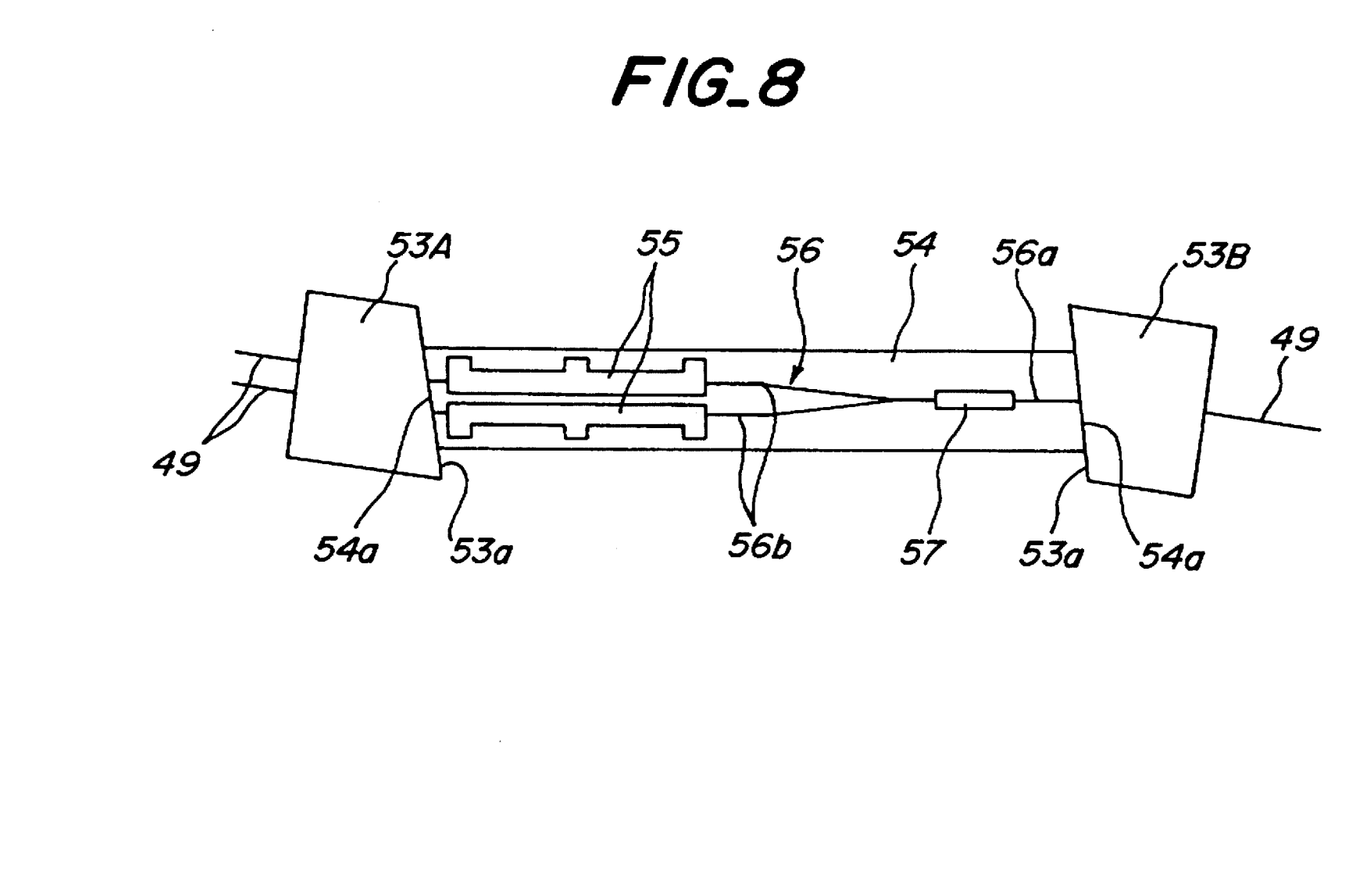
FIG. 8 is a plane view for illustrating an optical waveguide substrate 54 and a pair of optical fiber array units 53A and 53B to be coupled together by the present invention.

FIG. 8 is a plane view for illustrating an optical waveguide substrate 54 and a pair of the optical fiber array units 53A and 53B. This optical waveguide substrate 54 is provided with a so-called Y-shaped branched optical waveguide 56. The optical waveguide 56 includes a single optical waveguide portion 56a and two optical waveguide portions branched from one end of the portion 56a via a Y-shaped branched portion. A given signal voltage may be applied to each of the optical waveguide portions 56b via a control electrode 55.

Each of a pair of the optical fiber arrays 53A and 53B is formed with a V-groove (guide groove) by mechanical working. Two optical fibers 49 are held in the optical fiber array unit 53A, and coupled with the respective optical waveguide portions 56b. Another optical fiber 49 is held by the other optical fiber array unit 53B, and coupled with the optical waveguide portion 56a. In this embodiment, a polarizer 57 is formed on the optical waveguide portion 56a so that only that portion of the light entering optical fiber 49 held by the optical fiber array unit 53B that has a specific polarizing direction may pass through the optical waveguide portions 56b and modulated by the electrodes 55. According to the present invention, the end face 54a of the optical waveguide substrate 54 can be coupled with end face 53a of each of the optical fiber arrays 53A and 53B, while the parallel degree between the end faces is improved.

As having been mentioned above, the end faces of the optical substrates can be aligned automatically which extremely high accuracy according to the aligning apparatus of the present invention.

What is claimed is:

1. An apparatus for adjusting a degree of parallel alignment between opposing end faces of first and second optical substrates, comprising:

first and second holders for respectively holding the optical substrates, the first holder being rotatable around a vertical Y-rotational axis, and a moving mechanism for moving the first optical substrate along a movement direction toward the second optical substrate, whereby the opposed end faces of the optical substrates contact each other, and said end faces are aligned so as to be parallel with each other by exerting a contacting pressure upon the optical substrates in the movement direction such that the first holder rotates around the Y-rotational axis.

2. The apparatus claimed in claim 1, further comprising a pressure detector which detects a variation in said contacting pressure when said opposed end faces of the optical substrates are contacted with each other.

3. An apparatus for adjusting a degree of parallel alignment between opposing end faces of first and second optical substrates, comprising:

first and second holders for respectively holding the optical substrates, a moving mechanism for moving the first optical substrate along a movement direction toward the second optical substrate, whereby the opposed end faces of the optical substrates contact each other, and said end faces are aligned so as to be parallel with each other by exerting a contacting pressure upon the optical substrates in the movement direction, and a sliding mechanism and a clamping mechanism, wherein when the opposed end faces of the optical substrates are contacted with each other, the sliding mechanism allows said holder to slide, in a direction upon which a load is applied to the holder, so as to prevent application of an excess load upon the optical substrates, and said clamping mechanism fixes the sliding mechanism after the holder slides.

4. The apparatus claimed in claim 1, wherein at least one of the optical substrates is rotatably supported by two sets of rotary stages, said two sets of the rotary stages being freely turnable.

5. The apparatus claimed in claim 3, wherein at least one of the optical substrates is rotatably supported by two sets of rotary stages, said two sets of the rotary stages being freely turnable.

6. The apparatus claimed in claim 4, wherein a rotary center of each of the rotary stages is substantially in coincidence with the end face of said at least one of the optical substrates.

7. The apparatus claimed in claim 5, wherein a rotary center of each of the rotary stages is substantially in coincidence with the end face of said at least one of the optical substrates.

8. The apparatus claimed in claim 6, wherein a weight is provided on a side opposite to said at least one of the optical substrates as viewed from the rotary center of each of the optical substrates, said weight balancing the rotary stages when the rotary stages are in a stationary state.

9. The apparatus claimed in claim 7, wherein a weight is provided on a side opposite to said at least one of the optical substrates as viewed from the rotary center of each of the optical substrates, said weight balancing the rotary stages when the rotary stages are in a stationary state.

* * * * *